March 24, 1959 SIMEON ILYA TOURSHOU 2,879,391

BEAM DEFLECTION CONTROL FOR CATHODE RAY DEVICES

Filed March 4, 1957 2 Sheets-Sheet 1

INVENTOR.
SIMEON I. TOURSHOU
BY
[signature]
ATTORNEY

INVENTOR.
SIMEON I. TOURSHOU
BY
[signature]
ATTORNEY

Patented Mar. 24, 1959

2,879,391

BEAM DEFLECTION CONTROL FOR CATHODE RAY DEVICES

Simeon Ilya Tourshou, Camden, N.J., assignor to Radio Corporation of America, a corporation of Delaware Application March 4, 1957, Serial No. 643,832

9 Claims. (Cl. 250—36)

This invention relates to electric circuit means for producing and controlling a deflection control voltage for a cathode ray beam, and more particularly to improved circuit means for producing a deflection voltage for controlling the scanning deflection of a cathode ray beam in synchronism with recurrent synchronizing signals.

Deflection control systems in accordance with the invention are particularly adapted for use in television receiving systems wherein a cathode ray beam must be swept over its target area in synchronism with similar means at a transmitter to provide an undistorted image to be viewed at the receiving point. A deflection control system embodying the invention includes a blocking oscillator for developing a deflection voltage of suitable wave form, the frequency of which is controlled by a voltage developed in a phase comparison circuit. The control voltage may, for example, vary in accordance with the difference in phase between the generated oscillations and a transmitted signal which is indicative of timed operation of a signal source such as a video camera, to synchronize the oscillator with the transmitted signal.

In accordance with the invention, the phase comparison circuit includes an amplifier device which is connected with the oscillator circuit whereby at least a portion of the current through the phase comparison amplifier device is obtained through the control electrode of the oscillator. This not only reduces the number of circuit components required for operation, but increases the long term frequency stability of the circuit against the aging of the oscillator and control tube, operating potential changes or the like. The increased stability of the circuit results from a compensated control voltage developed in the control circuit due to changes in the grid current of the oscillator tube as will hereinafter be described.

A feature of the invention is the further improvement of the blocking oscillator strength and stability by the elimination of the generated deflection voltage wave from the frequency controlling circuit for the oscillator. More specifically, the sawtooth charging circuit is connected between anode and cathode and the blocking oscillator feedback transformer is connected to couple the grid and cathode of the oscillator rather than the grid and anode circuits of the oscillator as heretofore. This feature permits the construction of deflection generator and frequency control circuit therefore with a reduced number of circuit components while at the same time providing the high quality of performance necessary for commercial television applications.

Accordingly, it is an object of this invention to provide an improved deflection control circuit which uses a minimum number of circuit components and can be easily manufactured at low cost.

Another object of this invention is to provide an improved circuit for synchronizing the scanning rate of a cathode ray beam for television receiving systems or the like, with a recurrent synchronizing signal, which is stabilized against long term frequency changes due to the aging of tubes, power line voltage changes and the like.

A further object of this invention is to provide an improved blocking oscillator system for cathode ray deflection systems having increased oscillator strength and long-range stability of operation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
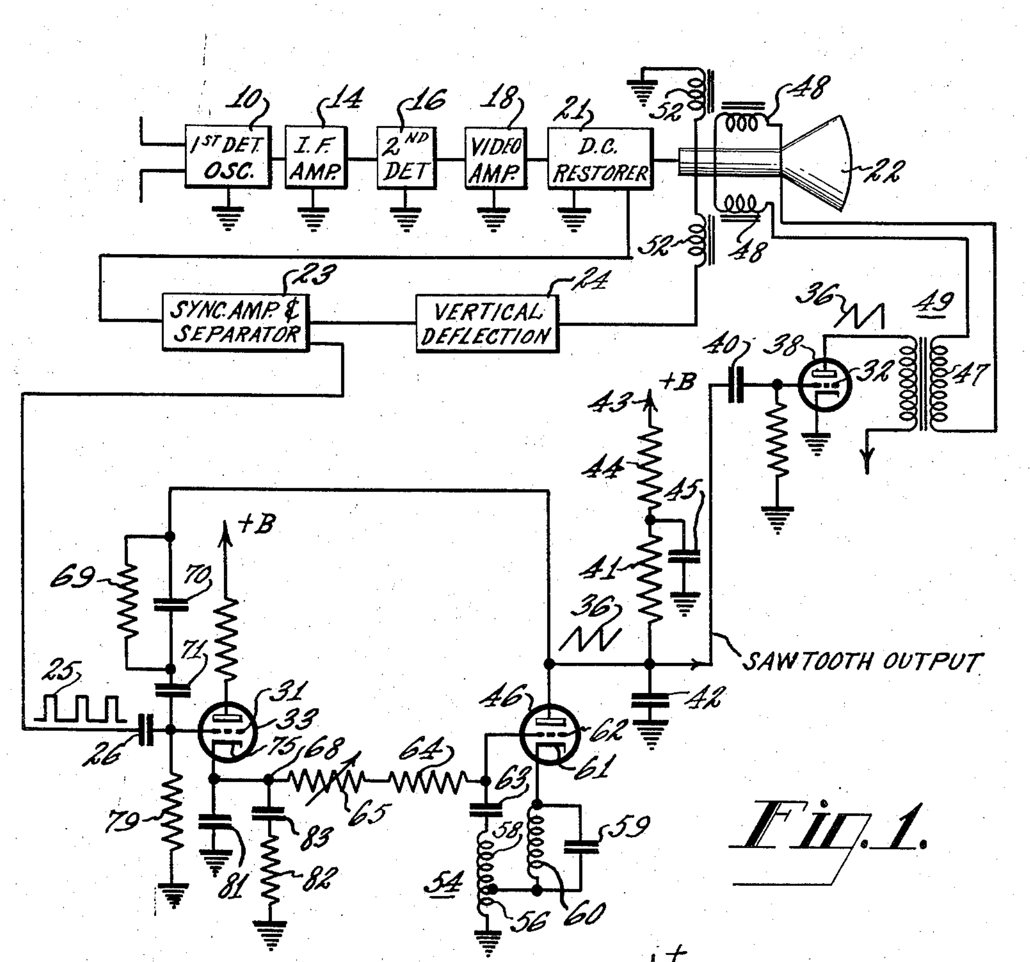
Figure 1 is a schematic circuit diagram of a television receiver having a deflection control circuit embodying the invention.
Figure 5:
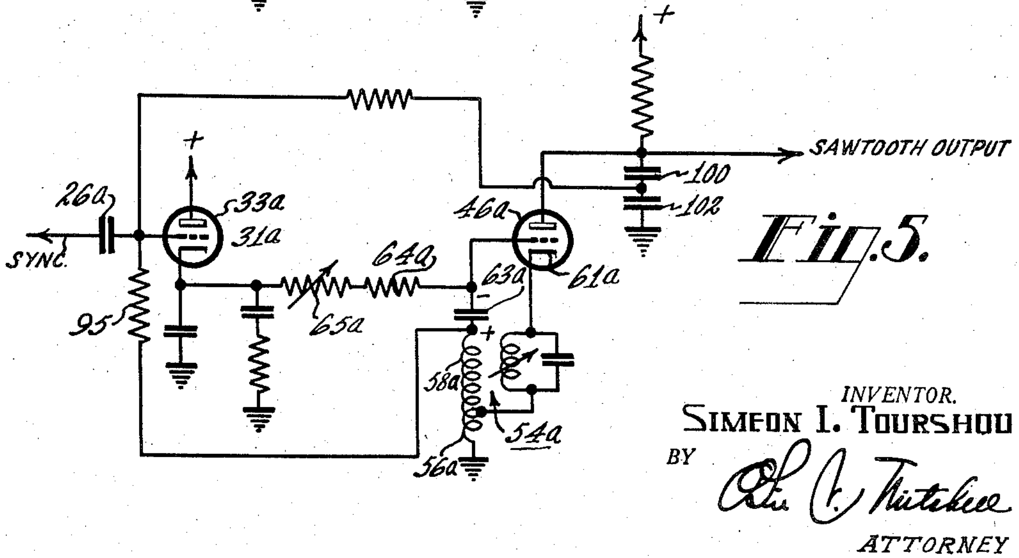
Figure 5 is a schematic circuit diagram of a modification of the deflection control circuit shown in Figure 1.

The general arrangement of Figures 1 and 5 is similar insofar as they show the principal units of a system embodying the invention. The invention as disclosed and as it will be described for the present, in connection with Figure 1 of the drawings, comprises essentially the combination of an oscillator and a tube which may be aptly referred to as a "control tube." The oscillator frequency is controlled by the development of a direct current bias. This bias is derived from a conbined signal and includes pulses having an energy content depending upon the existing phase relationship between a timed impulse or a series of such timed impulses and a locally generated or derived signal. In the embodiment of Figure 1, the pulses are the customary sync pulses which are produced or derived as the result of demodulation of a received television signal. In the illustrative form of the invention now being described, control of the high frequency or line deflection traces of a cathode ray beam in an image producing tube is shown but it will be understood that the invention is readily adapted for the control of the lower frequency or vertical deflection traces.

Figure 1 shows a portion of a television receiver of the superheterodyne type comprising the usual first detector 10, which incorporates a tunable oscillator, an intermediate frequency amplifier 14 and a second detector or demodulator 16. The output of the second detector 16 is applied to the video amplifier 18 and a D.C. level setting device of D.C. restorer 21 to control the image producing tube 22 in such a way that the cathode ray beam produces an intensity modulated pattern or raster on the tube target. This recreates the original image light values.

The detected signals are also supplied to a sync amplifier and separator 23 to separate the synchronizing signals from the video signals. Since the invention is illustrated in connection with a horizontal (or line) deflection control, it will be assumed that the vertical (field or frame) deflection signals are then suitably selected to control the slow speed cathode ray beam deflection through any suitable form of vertical deflection control 24. The components so far explained and mentioned are well known in general and require no further explanation.

The selected horizontal synchronizing pulses 25 (that is, the line pulses for providing a control of the rapid horizontal motion of the cathode ray beam) are supplied through a coupling capacitor 26 to the grid 31 of a control tube 33. For reasons of simplicity, the vertical input sync pulses are not shown, although in normal present day operation both the vertical and the horizontal or line sync pulses correspond to those proposed and recommended by the industry and by the National Television System Committee and which are found exemplified and shown on pages 22 and 23 of the book entitled "Television Standards and Practice" by Donald G. Fink, published by McGraw-Hill Book Company, Inc., New York, 1943. It should be understood, however, that the invention functions properly under the control of any suitable recurring sync pulse, but any illustrations herein given are applied, for simplicity, to the standardized signal form.

A saw-tooth of current 36 produced in the plate circuit of an output tube 38, in a manner to be described in connection with the functioning of a controlled oscillator tube 46, produces a scanning current in the secondary 47 of a transformer 49. A set of horizontal deflection coils 48 surrounds an appropriate part of the image tube 22 to produce line deflection of the cathode ray beam in the tube when supplied with current flowing in the secondary 47. The action of the coils 48 in conjunction with the action of a set of vertical (field or frame) deflection coils 24 produce the scanning raster. It will be understood that a damper tube (not shown) is usually provided in the plate circuit of the output tube as is well known.

The grid 32 of the output tube 38 is connected through suitable coupling means, shown as a capacitor 40 to a resistor and capacitor combination 41 and 42. The capacitor 42 is connected to a suitable source of positive potential (not shown) through the resistor 41 which serves as a charging resistor. The voltage supply source may be the usual "B+" or anode supply source generally associated with electronic equipment. The point of connection to the positive source is indicated as the terminal 43 and a resistor 44 is included in series with the resistor 41 to provide proper voltage for the supply connection. A filter capacitor 45 is included in the supply circuit. The capacitor 42 is charged through the resistor 41 and is discharged when a tube 46, which is provided with circuit connections so that it will serve as a blocking oscillator, becomes conductive. In this manner a sawtooth voltage waveform is developed across the capacitor 42 for driving the horizontal output tube 38.

The blocking oscillator circuit includes a single coil 54 which may be regarded as an autotransformer having a primary or cathode section 56 and a secondary or grid section 58. One end of the cathode section 56 is connected through a resonant sine wave generating circuit comprising a capacitor 59 and an inductor 60 to the cathode 61 of the oscillator tube 46, and the other end is connected directly to ground. The grid section 58 of the coil 54 is connected through a capacitor 63 to the grid 62 of the oscillator tube.

The oscillator grid leak path includes two resistors 64 and 65, the space current path of the control tube 33, and the +B supply for the control tube back to ground. In the present instance the resistor 65 comprises a potentiometer to provide a frequency or hold control for the deflection control circuit.

In the operation of the blocking oscillator the tube 46 is blocked during the portion of the cycle when the sawtooth capacitor 42 is charging, by a charge on the capacitor 63 which holds the grid 62 negative. This charge on the capacitor 63 leaks off through the resistors 64 and 65 at a rate controlled by the potential at the cathode 75 of the tube 33, which potential is a function of the current through the control tube 33 as will hereinafter be described. When the negative charge on the capacitor 63 has decreased sufficiently that the conduction point of the oscillator tube 46 is reached, the grid 62 is immediately driven more positive with respect to the cathode 61 due to transformer action of the coil 54. This causes the grid 62 to draw current to charge the capacitor 63.

Figure 2:
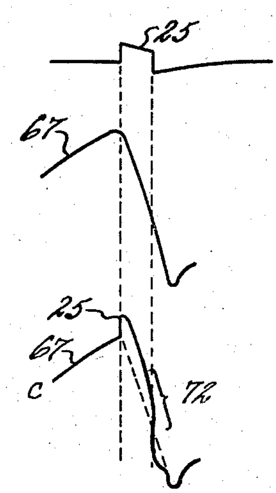
Figures 2, 3 and 4 are representations of assumed signal wave forms referred to in explaining the operation of the circuit of Figure 1.
Figure 3:
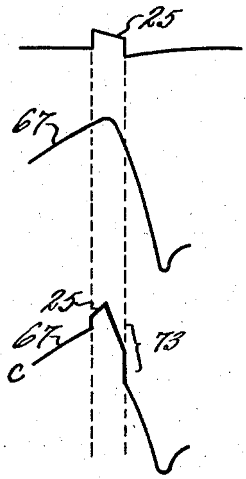
Figure 4:
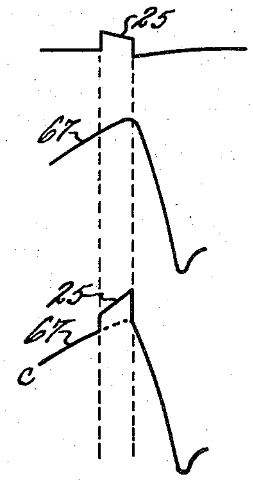

After the sawtooth capacitor 42 has discharged through the oscillator tube 46, the grid 62 is driven abruptly negative, the negative charge for this purpose being as indicated, stored in the capacitor 63. The rate of discharge of the capacitor 63 is controllable by a voltage derived as a result of the comparison between the wave 67 (Figures 2, 3 and 4) which is derived from the blocking oscillator 46 and the incoming sync pulses 25. The comparison of the sawtooth wave 67 and the sync pulses 25 is effected in a phase comparison circuit including a control tube 33 which is connected to develop the desired control voltage at the cathode 75. To this end, a circuit comprising the parallel combination of a resistor 69 and a capacitor 70 in series with a blocking capacitor 71 provides a partially integrated sawtooth waveform 67 as indicated in Figures 2, 3 and 4, at the grid 31 of the control tube 33. The curve C in Figures 2, 3 and 4 illustrates various combinations of the synchronizing pulses 25 and the modified sawtooth voltage 67 when the oscillator 46 is in synchronism with the horizontal pulses.

Normally, the free running frequency of the oscillator 46 is slightly lower than the desired scanning frequency which for presently used horizontal oscillators in television receivers is 15,750 cycles per second. When the difference between the free running frequency and the desired scanning frequency is relatively small, only a small portion of the sync pulse falls on top of the modified sawtooth cycle 67 and the remainder of the sync pulse appears as a distortion 72 of the modified sawtooth wave as shown in Figure 2. With a greater difference between the free running frequency and the desired scanning rate, a larger portion of the sync pulse falls on top of the sawtooth wave cycle as represented in Figure 4. Conditions of operation are such that the control tube cathode 75 is less positive due to control tube current if the free running frequency of the oscillator is close to the desired scanning rate. This follows from the fact that the area under the small active portion of the sync pulse, which is on top of the sawtooth is also small and therefore the average current in tube 33 is less. If the oscillator tends to run slow, the control tube cathode 75 is more positive, due to a greater average control tube current as indicated in Figure 4. The condition of Figure 3 shows a condition of operation between Figures 2 and 4 with a portion of the sync pulse appearing as a distortion 73. Normal operation of the system is generally within the range between the conditions shown by Figures 2 and 3 including the conditions of Figures 2 and 3. This may be regarded as the "pull-in" range. The "hold" range for the system lies between the conditions of Figures 2 and 4 including the conditions of Figures 2 and 4.

As can be seen from Figures 2, 3 and 4 the current through the control tube 33 is in the form of pulses occurring at the coincidence of the sync pulses and the sawtooth voltage peaks. The voltage produced across the resistors 64 and 65 by these current pulses is averaged out by a filter comprising a condenser 81 and the resistor condenser combination 82 and 83. The capacitance of the capacitor 81 must be large enough to provide adequate filtering of the voltage pulses developed at the cathode 75. Without the resistor 82 it would take a relatively long time to build up the voltage at the cathode 75 required to correct the charging speed of the oscillator 46. The values of the resistor capacitor combination 82, 83, are selected to reduce the total time constant of the filter network so that the correcting action of the network acts much faster to provide the necessary control voltage to maintain the oscillator frequency at the desired rate.

The full cathode current for the control tube 33 flows through the grid 62 of the oscillator tube 46. To this end the cathode 75 of the control tube is connected through the series resistors 64 and 65 to the control grid 62 of the oscillator tube. The grid 31 circuit of the control tube is returned to ground through a grid leak resistor 79, and back to the cathode 75 through the cathode section 56 of the coil 54 and the grid-cathode space current path of the oscillator tube 46.

The resonant circuit comprising the condenser 59 and the inductor 60 develops a sine wave which is superimposed on the exponential discharge voltage on the grid 62 of the oscillator tube 46 due to the capacitor 63. The grid voltage, therefore, approaches the firing point more abruptly near the normal firing point or bias level at which the oscillator will begin to repeat its cycle of operation. This prevents an inadvertent rise in the grid voltage and firing of the tube 46 due to changes in tube circuit conditions, or other causes. Therefore, the control exercised by the guiding or control voltage applied from the control tube cathode 75 becomes predominant.

Several advantages are obtained by connecting the coil 54 between the grid and cathode of the oscillator tube, rather than between grid and plate. For example, the oscillator strength and stability is improved since the negative swing of the sawtooth (while the oscillator tube is conducting) is eliminated from the positive pulse on the grid thereby allowing the grid to remain more positive during this portion of the cycle to sustain stronger oscillation. Furthermore, since the loading effect of the oscillator grid circuit is eliminated from the resistor capacitor circuit for developing the sawtooth voltage, it was found that a much higher impedance (smaller capacitance and larger resistance) can be used in the plate circuit of the oscillator tube 46 thereby making the amplitude of the sawtooth less dependent on the parameters of the tube. The smaller charging capacitor 46 permits about a 50 percent greater sawtooth voltage output with the same B+ source and at the same time reduces the peak current which must be carried by the oscillator tube 46.

Another advantage provided by the oscillator circuit shown is that a larger capacitor can be used in the grid circuit thereby widening or increasing the time of the current pulse through the oscillator tube. This reduces the peak current through the tube thereby increasing the life of the oscillator tube.

The long-range frequency stability of the deflection control circuit of the invention is considerably improved by connecting the control tube so that its cathode current flows through the grid 62 of the oscillator tube 46. Thus, if the oscillator ages, resulting in decreased emission from the oscillator cathode 61, less grid current tends to flow. This results in a decreased negative charge on the capacitor 63 which in turn would ordinarily cause the oscillator to speed up since the capacitor would more quickly discharge to the firing point of the oscillator tube. By the same token, aging of the control tube 33 results in decreased cathode current making the cathode 75 less positive which would ordinarily cause the oscillator to slow down. These two factors counteract each other so that the net effect is to maintain the frequency of the oscillator at the desired rate.

This compensating effect is also true with respect to variations in the applied operating potential. For example, an increased voltage applied to the oscillator causes stronger oscillation which tends to charge the oscillator capacitor more negatively. The time required for the discharge of this capacitor to the conduction point of the oscillator tube increases accordingly resulting in decreased oscillator frequency. In accordance with the invention such changes are compensated by the control tube by the more positive cathode potential developed to maintain the oscillator frequency constant.

The circuit described also provides an added advantage of simplicity of construction in that fewer component parts are required in the manufacture of a circuit which provides the operating characteristics necessary to high quality television receiver operation.

Figure 5 shows another embodiment of the invention wherein the phase of the oscillator signal may be shifted relative to the incoming sync signals. As explained above in connection with Figure 1, the oscillator synchronization is controlled by the relative phase of the incoming sync signals and a modified form of the sawtooth wave fed back from the horizontal oscillator. Therefore, if the sawtooth voltage is shifted in phase by the feedback path, the control circuit would operate to shift the phase of the signal developed by the oscillator. In describing Figure 5 of the operation thereof, parts which perform a similar function to the corresponding parts in Figure 1 will be given the same reference character with the suffix *"a"* added.

Figure 6:
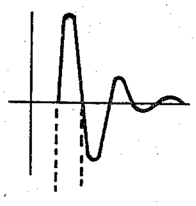
Figures 6, 7 and 8 are representations of assumed signal wave forms referred to in explaining the operation of Figure 5.
Figure 7:
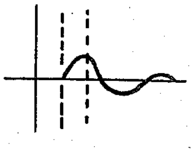
Figure 8:
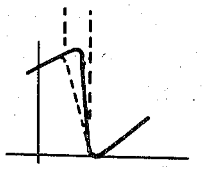

Since the phasing of the sawtooth wave is determined by the cut-off part of the parabola on the control grid 31*a* of the control tube 33*a*, a shift in the phase of the signal developed by the oscillator 46*a* can be obtained by delaying the cut-off of the control tube 33*a*. To this end, a grid leak resistor 95 is connected between the control grid 31*a* and the junction of the capacitor 63*a* and the coil 54*a* in the oscillator circuit. A portion of the oscillator pulse which is shown in Figure 6 is integrated by the grid leak resistor 95 and the sync coupling capacitor 26*a* to provide the modified wave form shown in Figure 7. The integrated oscillator pulse is of lower amplitude and extends over a slightly longer time period than the oscillator pulse. The integrated oscillator pulse is then combined with the modified sawtooth wave form fed to the control grid from the anode circuit of the oscillator 46 to provide a modified wave form as shown in Figure 8. The modified sawtooth wave form 96 as shown in Figure 8 combines with the integrated oscillator pulse to produce the wave 97 which results in a delayed cut-off of the control tube 33*a*. Thus the phase of the oscillator will be shifted until the sync pulses are coincident with the peak of the modified wave at the grid 31*a* of the control tube 33*a*.

Another feature of this circuit is the elimination of the capacitors 71 and 70 of Figure 1. To accomplish this, the sawtooth forming circuit comprises a pair of series capacitors 100 and 102 connected between the anode of the oscillator tube 46*a* and ground. The integrating resistor 68*a* is then connected from the junction of the series capacitors 100 and 102 to the control grid 31*a* of the control tube 33*a*. This network integrates the sawtooth voltage wave appearing at the anode of the oscillator tube 46*a* to provide the modified parabola at the grid 31*a* of the control tube 33*a*.

Figure 9:
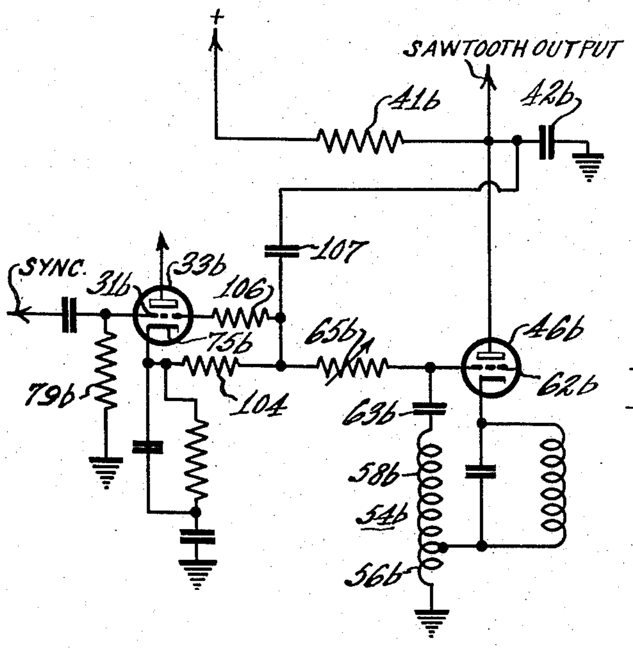
Figure 9 is a schematic circuit diagram of a still further modification of the deflection control circuit shown in Figure 1.

With reference to Figure 9, which shows a further embodiment of the invention, the sawtooth feedback circuit to the control tube has been modified to further reduce the number of circuit elements required. In describing Figure 9 all parts which perform a similar function to the corresponding parts of Figure 1 will be given the same reference character with the suffix *"b"* added.

The control circuit shown in Figure 9 also differs slightly from that shown in Figure 1 in that the cathode 75*b* of the control tube 33*b* is connected with the grid 62*b* with the oscillator 46*b* through two series resistors 104 and 65*b*. The control electrode 31*b* is connected to the junction of the resistors 104 and 65*b* through an additional grid leak resistor 106. The second grid leak resistor 106 reduces the degeneration in the control tube circuit.

It will be seen that the circuit of Figure 9 provides an alternate direct current path between the cathode 75*b* and ground through the resistors 106 and 79*b*. However, the resistance of this circuit is relatively high with respect to the resistance of the circuit through the control grid to the oscillator tube 46*b*. Solely, by way of example, values will be given for certain of the components which are most closely concerned with the present invention. These values have been found effective in practice and their recitation herein is illustrative of the invention in one of its embodiments rather than restrictive. The capacitance **63*b* may have a value of 470 mmf. The resistors 65*b* and 104 may have values of 25,000 and 100,000 ohms respectively, and the resistors 106 and 79*b*** may have values of 390,000 and 270,000 ohms respectively.

The sawtooth voltage waveform developed across the capacitor **42*b* is fed to the junction of the resistors 104 and 106 through a capacitor 107. To provide a relatively noise immune control circuit for the oscillator 46*b* it is desirable to partially integrate the sawtooth wave in the feedback circuit so that each cycle of the wave does not change abruptly but is rounded as a modified parabolic wave as it appears at the grid 31*b*. The sawtooth voltage wave is integrated by the control tube grid leak resistor 106 and the input capacitance of the control tube to provide the desired wave shape for comparison with the incoming sync signals. It can be seen that in this circuit arrangement the resistor serves the dual function of providing a grid leak resistor for the control tube, and an integrating resistor for the sawtooth feed back circuit. This permits the elimination of a series resistor which would otherwise be required in the sawtooth feed back connection to the grid 31*b*** of the control tube.

The cathode ray beam deflection control described provides an improved circuit for synchronizing the scanning rate of a cathode ray beam in a television receiving system or the like with a recurrent synchronizing signal. The system described not only stabilizes the circuit against long term frequency changes due to aging of the tubes, line voltage variations and the like, but uses a minimum number of circuit components which permits low cost manufacture.

What is claimed is:

1. A beam deflection control circuit for controlling the scanning deflection of a cathode ray beam in synchronism with a recurrent synchronizing signal comprising in combination, a blocking oscillator including an amplifying device having a current controlling electrode, a capacitor connected to said current controlling electrode, circuit means completing a current path including said electrode for charging said capacitor to a potential for biasing said amplifying device to a non-conducting condition during a portion of said oscillator cycle, means providing a discharge circuit path for said capacitor including a second amplifying device, the entire current through said second amplifying device being derived from said current path and means for controlling the conduction of said second amplifying device in accordance with the difference in phase between oscillations generated by said blocking oscillator and a recurrent synchronizing signal.

2. A beam deflection control circuit for controlling the scanning deflection of a cathode ray beam in synchronism with a recurrent synchronizing signal comprising in combination, a blocking oscillator including an electron discharge device having a plurality of electrodes, a capacitor connected with one of said electrodes, circuit means completing a current path including said one electrode for charging said capacitor to a potential for maintaining said electron discharge device nonconductive during a portion of said oscillator cycle, means providing a discharge circuit path for said capacitor including the space current path of a second electron discharge device, the entire current through said second electron discharge device being derived from said current path and means for controlling the conduction of said second electron discharge device in accordance with the difference in phase between oscillations generated by said blocking oscillator and a recurrent synchronizing signal.

3. In a television system, oscillator means including an oscillator tube having a control grid for producing a peaked wave in which the total potential change in one polarity direction extends over a greater period of time than the corresponding total potential change in the opposite polarity direction, means providing a source of sync signal pulses, means for combining said peaked wave and said sync signal pulses in such a phase relationship that the sync signal pulses correspond with the peaks of said peaked wave during desired operation of such a system, means comprising a discharge tube for developing an output voltage in accordance with the phase changes of said sync signal pulses with respect to the peaks of said peaked wave, means for automatically controlling the frequency of said oscillator in response to said output voltage to maintain the desired operation of said system, and means for connecting said discharge tube with said oscillator tube whereby the entire space current flowing in said discharge tube flows through the grid of said oscillator tube.

4. In a television system, a circuit for controlling the scanning deflection of a cathode ray beam in synchronism with recurrent synchronizing signals comprising the combination of a blocking oscillator including an oscillator tube having a control electrode for producing a peaked wave in which the total potential change in one polarity direction extends over a greater period of time than the corresponding total potential change in the opposite polarity direction, circuit means providing a source of sync signal pulses derived from a received television signal wave, means for combining said peaked wave and said sync signal pulses in such a phase relationship that the sync signal pulses correspond with the peaks of said peaked wave during desired operation of such a system, a control circuit including a discharge tube having a cathode, means for developing at said discharge tube cathode an output voltage in accordance with the phase changes of said sync signal pulses with respect to the peaks of said peaked wave, and means providing a direct current connection between said cathode with the control electrode of said oscillator tube so that the entire space current of said control tube flows through said oscillator control electrode, the output voltage developed at said cathode being applied to the control electrode of said oscillator tube through said last named means for automatically controlling the frequency of said oscillator in response to said output voltage to maintain the desired operation of said system.

5. In a television system, a circuit for controlling the scanning deflection of a cathode ray beam in synchronism with recurrent synchronizing signals, comprising the combination of a blocking oscillator including an oscillator tube having a control grid for producing a peaked wave in which the total potential change in one polarity direction extends over a greater period of time than the corresponding total potential change in the opposite polarity direction, circuit means connected with said control grid providing a voltage for maintaining said oscillator tube cut off during said greater period of time, means providing a source of sync signal pulses derived from a received television signal wave, means for combining said peaked wave and said sync signal pulses in such a phase relationship that the sync signal pulses correspond with the peaks of said peaked wave during desired operation of such a system, means for developing an output voltage in accordance with the phase changes of said sync signal pulses with respect to the peaks of said peaked wave, means for automatically controlling the frequency of said oscillator in response to said output voltage to maintain the desired operation of said system, and means for combining a portion of the voltage on the grid of said oscillator tube with said peaked wave to shift the phase of said peaked wave relative to said recurrent sync signal pulses.

6. In a television receiver a blocking oscillator for producing a sawtooth voltage wave comprising a first electron tube having a cathode, an anode and a control electrode, a first capacitor and operating potential supply means for charging said capacitor connected with said anode, a second capacitor and an oscillator transformer winding connected between said cotrol electrode and a point of fixed reference potential, said cathode being connected to a tap on said oscillator transformer winding at a point between said control electrode and said point of fixed reference potential, said second capacitor adapted to be charged through said control electrode to a potential for maintaining said electron tube cut off during a portion of said oscillator cycle, a control circuit for said oscillator including a second electron tube having a cathode, an anode and a control electrode, means including a first resistor connecting the cathode of said control tube to the control electrode of said oscillator so that substantially the entire space current of said control tube flows through said oscillator control grid, circuit means adapted to provide recurrent synchronizing signals derived from a received television signal connected with the control electrode of said control tube, means including a second resistor connected between the anode of said oscillator tube, and the control electrode of said control tube for applying said sawtooth signal to said control tube, and filter means connected between the cathode of said control tube and ground for deriving a control voltage across said first resistor in accordance with the phase changes of said sync signal pulses with respect to the peaks of said sawtooth wave to regulate the discharge of said second capacitor.

7. In a television receiver a blocking oscillator for producing a sawtooth voltage wave comprising a first electron tube having a cathode, an anode and a control electrode, a first capacitor and operating potential supply means for charging said capacitor connected with said anode, a second capacitor and an oscillator coil connected between said control electrode and ground, said cathode being connected to said oscillator coil at a point above ground, said second capacitor adapted to be charged through said control electrode to a potential for maintaining said electron tube cut off during a portion of said oscillator cycle, a control circuit for said oscillator including a second electron tube having a cathode, an anode and a control electrode, means including first and second resistors connecting the cathode of said control tube to the control electrode of said oscillator so that substantially the entire space current of said control tube flows through said oscillator control grid, a grid leak resistor connected between the control electrode and the junction of said first and second resistors, circuit means adapted to provide recurrent synchronizing signals derived from a received television signal connected with the control electrode of said control tube, means including a capacitor connected between the anode of said oscillator tube and the control electrode of said control tube for applying said sawtooth signal to said control tube, and filter means connected between said cathode and ground for developing a control voltage in accordance with the phase changes of said sync signal pulses with respect to the peaks of said sawtooth wave to regulate the discharge of said second capacitor.

8. In a television system, a circuit for controlling the scanning deflection of a cathode ray beam in synchronism with recurrent synchronizing signals, comprising the combination of a blocking oscillator including an oscillator tube having a control grid and cathode for producing a peaked wave in which the total potential change in one polarity direction extends over a greater period of time than the corresponding total potential change in the opposite polarity direction, circuit means including a capacitor and a transformer winding having a tap thereon connected in series between said control grid and a point of reference potential for said oscillator, means connecting said cathode with said tap, said capacitor adapted to be charged through said control grid to maintain said oscillator tube cut-off during said greater period of time, means providing a source of sync signal pulses derived from a received television signal, means including a control tube having a control grid and cathode for combining said peaked wave and said sync signal pulses in such a phase relationship that the sync signal pulses correspond with the peaks of said peaked wave during desired operation of said system, and means including a resistor connected between the cathode of said control tube and control grid of said oscillator tube for developing at the cathode of said control tube an output voltage in accordance with the phase changes of said sync signal pulses with respect to the peaks of said peaked wave for automatically controlling the frequency of said oscillator in response to said output voltage to maintain the desired operation of the system.

9. In a television system, a circuit for controlling the scanning deflection of a cathode ray beam in synchronism with recurrent synchronizing signals, comprising the combination of a blocking oscillator including an oscillator tube having an anode, control grid and cathode for producing a peaked wave in which the total potential change in one polarity direction extends over a greater period of time than the corresponding total potential change in the opposite polarity direction, circuit means including a capacitor and a transformer winding having a tap thereon connected in series between said control grid and a point of reference potential for said oscillator, means connecting said cathode with said tap, said capacitor adapted to be charged through said control grid to maintain said oscillator tube cut-off during said greater period of time, means providing a phase comparison circuit including a control tube having at least a cathode and a control grid for combining said peaked wave and sync signal pulses derived from a received television signal, means including a first and second resistors connected between the cathode of the control tube and the control grid of the oscillator tube for developing an output voltage in accordance with phase changes of said sync signal pulses with respect to the peaks of said peaked wave, a grid leak resistor connected between the control grid of the control tube and the junction of said first and second resistors, means for applying said peaked wave to said control grid of said control tube including a capacitor connected between the anode of said oscillator tube and the junction of said first and second resistors.

References Cited in the file of this patent

UNITED STATES PATENTS

| | | |
|---|---|---|
| 2,536,816 | Krumhansl et al. | Jan. 2, 1951 |
| 2,633,538 | Tourshou | Mar. 31, 1953 |
| 2,702,348 | Stacy | Feb. 15, 1955 |